No. 607,088. Patented July 12, 1898.
G. SATTLER.
RUNNER ATTACHMENT FOR BICYCLES.
(Application filed Feb. 3, 1898.)
(No Model.) 2 Sheets—Sheet 1.
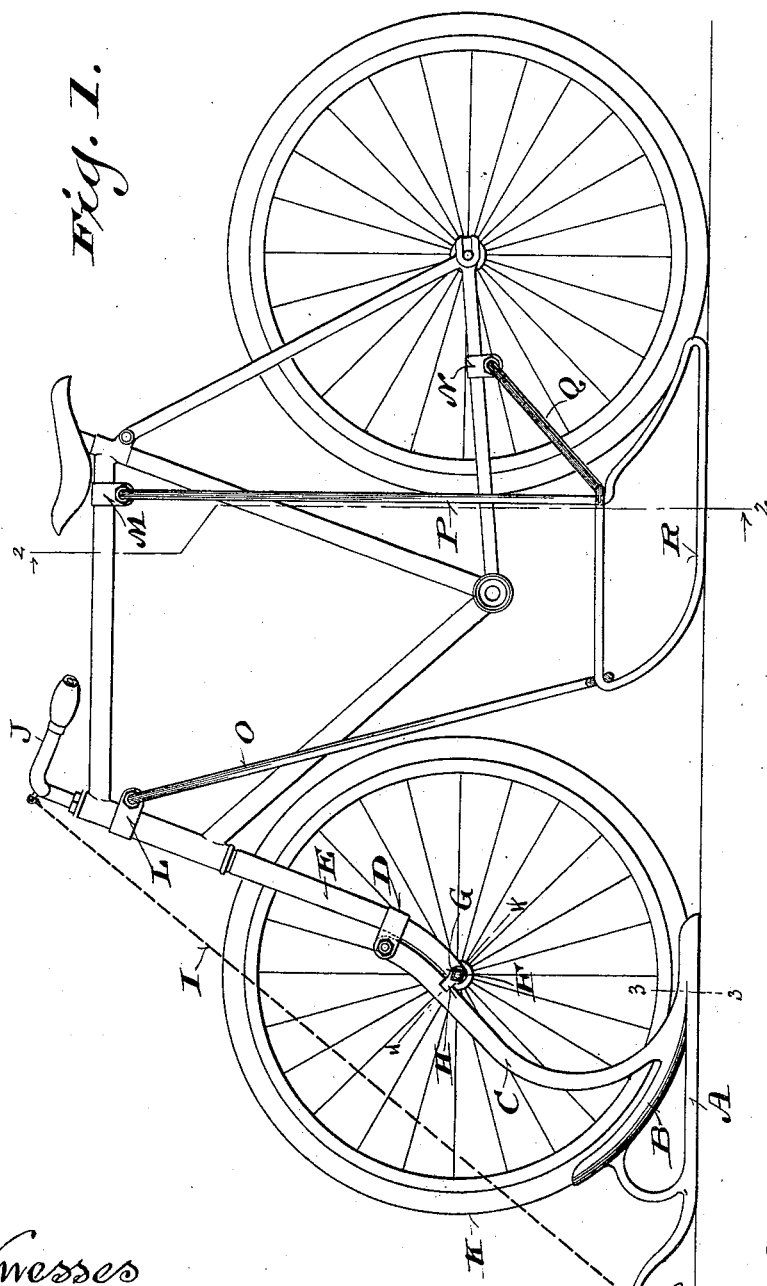

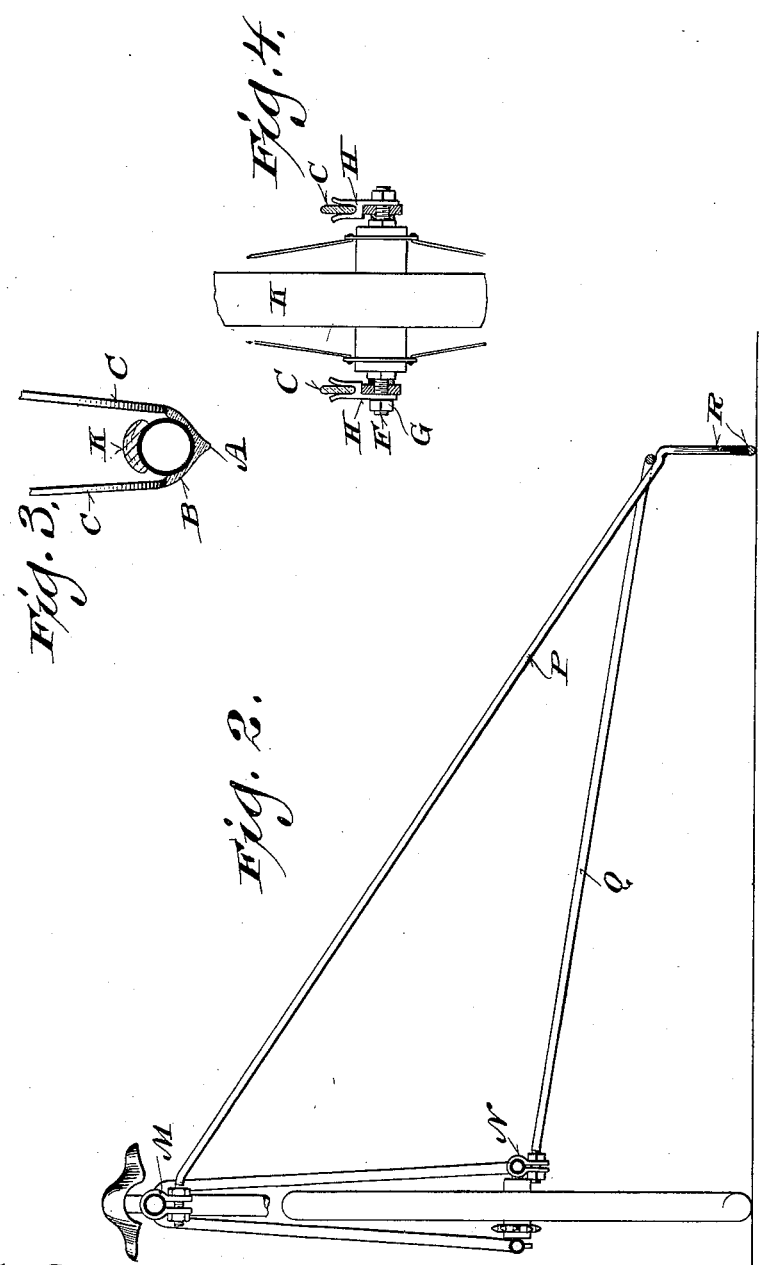

UNITED STATES PATENT OFFICE.

GEORGE SATTLER, OF ELKHART, WISCONSIN.

RUNNER ATTACHMENT FOR BICYCLES.

SPECIFICATION forming part of Letters Patent No. 607,088, dated July 12, 1898.

Application filed February 3, 1898. Serial No. 668,921. (No model.)

*To all whom it may concern:*

Be it known that I, GEORGE SATTLER, a citizen of the United States, and a resident of Elkhart, in the county of Sheboygan and State of Wisconsin, have invented certain new and useful Improvements in Bicycle Attachments; and I do hereby declare that the following is a full, clear, and exact description thereof.

My invention has for its object to provide for the utilization of safety-type bicycles on snow or ice roads; and it consists in the bicycle attachments hereinafter set forth with reference to the accompanying drawings and subsequently claimed.

Figure 1 of the drawings represents a side elevation of a safety-type bicycle provided with attachments that come within the scope of my invention, the pedals and gearing of said bicycle being omitted; Fig. 2, a partly transverse sectional view indicated by line 2 2 in the preceding figure, and Figs. 3 and 4 detail sectional views respectively indicated by lines 3 3 and 4 4 in the first figure.

Referring by letter to the drawings, A represents a runner provided with a tire-shield B and arms C, the latter being in pivotal connection with clips D, arranged on sides E of a safety-type bicycle steering-fork. Engaging the steering-wheel axle F of the bicycle, between the steering-fork sides and outer nuts G, are the shanks of bifurcated brackets H, that constitute rests for the arms of the aforesaid runner, and the forward end of this runner has flexible connection I with the handle-bar J of said bicycle.

From the foregoing it will be understood that steering-wheel K of the bicycle is normally at rest in the tire-shield portion of the runner A; but by backing the bicycle and pulling on the flexible connection I said runner may be adjusted on the wheel-tire to come out of the way of obstructions and to permit of said wheel running on bare places in the road.

Arranged on various parts of the bicycle-frame are clips L M N, engaged by screw-threaded ends of arms O P Q of another runner R, these screw-threaded ends of the arm-runners being engaged by clamp-nuts for the clips. The latter runner and its arms may be made of rod-iron suitably fashioned, it being practical, as herein shown, to make said runner and two of its arms from a single piece of such iron. The length of the stay-arms for runner R is such that the latter will travel in one track of a snow or ice road and the bicycle will be propelled in the usual manner in the opposite parallel track of said road.

The runner R may be utilized independent of runner A, and there may be considerable variation of mechanical detail without departure from the scope of my invention.

Having thus described my invention, what I claim as new, and desire to secure by Letters Patent, is—

1. A runner having a series of arms provided with clips for detachable rigid connection with frame members of a safety-type bicycle, the length of the several arms being such that the runner is held to travel in one track of a snow or ice road when the bicycle is propelled along the opposite parallel track of said road.

2. A runner having a series of arms provided with clips for detachable rigid connection with frame members of a safety-type bicycle, the length of the several arms being such that the runner is held to travel in one track of a snow or ice road when the bicycle is propelled along the opposite parallel track of said road, another runner having arms in detachable clip connection with steering-fork sides of said bicycle, and a tire-shield constituting part of the latter runner.

3. A runner having arms attachable to the frame of a bicycle, the length of the arms being such that the runner will travel one track of a snow or ice road when the bicycle is propelled along the other parallel track of said road, another runner having arms pivotally attachable to steering-fork sides of said bicycle and provided with a shield for the steering-wheel tire, brackets attachable to the steering-wheel axle to constitute rests for the arms of the latter runner, and a flexible lifting connection between said latter runner and the handle-bar of the aforesaid bicycle.

In testimony that I claim the foregoing I have hereunto set my hand, at Elkhart, in the county of Sheboygan and State of Wisconsin, in the presence of two witnesses.

GEORGE SATTLER.

Witnesses:
GEO. BRICKBAUER,
G. A. KRAEMER.